(12) United States Patent
Khlat et al.

(10) Patent No.: US 11,539,290 B2
(45) Date of Patent: Dec. 27, 2022

(54) POWER MANAGEMENT CIRCUIT OPERABLE WITH LOW BATTERY

(71) Applicant: Qorvo US, Inc., Greensboro, NC (US)

(72) Inventors: Nadim Khlat, Cugnaux (FR); Michael R. Kay, Summerfield, NC (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/218,904

(22) Filed: Mar. 31, 2021

(65) Prior Publication Data
US 2022/0037982 A1 Feb. 3, 2022

Related U.S. Application Data

(60) Provisional application No. 63/058,916, filed on Jul. 30, 2020.

(51) Int. Cl.
*G05F 1/59* (2006.01)
*G05F 1/575* (2006.01)
(Continued)

(52) U.S. Cl.
CPC .............. *H02M 3/07* (2013.01); *G05F 1/56* (2013.01); *H02M 1/0045* (2021.05); *H02M 3/155* (2013.01)

(58) Field of Classification Search
CPC ........ G05F 1/56; G05F 1/575; H02M 1/0045; H02M 3/07–073
See application file for complete search history.

(56) References Cited

U.S. PATENT DOCUMENTS

| 8,159,309 B1 | 4/2012 | Khlat et al. |
| 8,718,188 B2 | 5/2014 | Balteanu et al. |

(Continued)

FOREIGN PATENT DOCUMENTS

| DE | 102019218816 A1 | 6/2020 | |
| WO | WO-2018187245 A1 * | 10/2018 | ............ H03F 1/0211 |
| WO | 2021016350 A1 | 1/2021 | |

OTHER PUBLICATIONS

Mellon, L., "Data Transmission—Parallel vs Serial," Jul. 10, 2017, https//www.quantil.com/content-delivery-insights/content-acceleration/data-transmission/, 4 pages.

(Continued)

*Primary Examiner* — Sisay G Tiku
(74) *Attorney, Agent, or Firm* — Withrow & Terranova, P.L.L.C.

(57) ABSTRACT

A power management circuit operable with low battery is provided. The power management circuit is configured to generate a time-variant average power tracking (APT) voltage based on a battery voltage supplied by a voltage source (e.g., battery). In examples disclosed herein, the power management circuit can be configured to remain operable when the battery voltage drops below a low battery threshold. Specifically, the power management circuit maintains the time-variant APT voltage at a constant level in response to the battery voltage dropping below the low battery threshold to thereby avoid drawing a rush current from the voltage source. As a result, a wireless device employing the power management circuit can remain operable with low battery to continue to support critical applications.

17 Claims, 5 Drawing Sheets

(51) Int. Cl.
*H02M 1/00* (2006.01)
*H02M 3/07* (2006.01)
*G05F 1/56* (2006.01)
*H02M 3/155* (2006.01)

(56) References Cited

U.S. PATENT DOCUMENTS

| | | | |
|---|---|---|---|
| 8,912,769 B2* | 12/2014 | Lin | H02M 3/1582 323/224 |
| 9,020,453 B2 | 4/2015 | Briffa et al. | |
| 9,069,365 B2 | 6/2015 | Brown et al. | |
| 9,148,090 B2 | 9/2015 | Tsuji | |
| 9,172,331 B2 | 10/2015 | Nagasaku et al. | |
| 9,231,527 B2 | 1/2016 | Hur et al. | |
| 9,350,299 B2 | 5/2016 | Tsuji | |
| 9,391,567 B2 | 7/2016 | Kaczman | |
| 9,407,476 B2 | 8/2016 | Lim et al. | |
| 9,496,828 B2 | 11/2016 | Ye | |
| 9,614,477 B1 | 4/2017 | Rozenblit et al. | |
| 9,634,560 B2 | 4/2017 | Ek | |
| 10,097,145 B1* | 10/2018 | Khlat | H03F 1/0211 |
| 10,103,926 B1 | 10/2018 | Khlat | |
| 10,142,074 B2 | 11/2018 | Wang et al. | |
| 10,243,524 B2 | 3/2019 | Or | |
| 10,778,094 B2 | 9/2020 | de Cremoux | |
| 10,862,428 B2 | 12/2020 | Henzler et al. | |
| 10,998,859 B2 | 5/2021 | Khlat | |
| 11,018,627 B2 | 5/2021 | Khlat | |
| 11,018,638 B2 | 5/2021 | Khlat et al. | |
| 11,223,325 B2* | 1/2022 | Drogi | H03F 1/0227 |
| 2003/0099230 A1 | 5/2003 | Wenk | |
| 2004/0179382 A1 | 9/2004 | Thaker et al. | |
| 2013/0141063 A1 | 6/2013 | Kay et al. | |
| 2013/0141068 A1* | 6/2013 | Kay | H02M 1/14 323/282 |
| 2014/0055197 A1* | 2/2014 | Khlat | H03F 3/45663 330/127 |
| 2014/0312710 A1 | 10/2014 | Li | |
| 2016/0294587 A1* | 10/2016 | Jiang | H03F 3/21 |
| 2018/0234011 A1 | 8/2018 | Muramatsu et al. | |
| 2018/0257496 A1 | 9/2018 | Andoh et al. | |
| 2018/0278213 A1* | 9/2018 | Henzler | H03F 3/195 |
| 2018/0351454 A1* | 12/2018 | Khesbak | H03F 1/0227 |
| 2019/0068234 A1* | 2/2019 | Khlat | H04B 1/40 |
| 2019/0109566 A1 | 4/2019 | Folkmann et al. | |
| 2019/0181813 A1 | 6/2019 | Maxim et al. | |
| 2019/0222175 A1* | 7/2019 | Khlat | H03F 3/189 |
| 2019/0288645 A1* | 9/2019 | Nag | H03F 3/245 |
| 2019/0334750 A1 | 10/2019 | Nomiyama et al. | |
| 2019/0356285 A1* | 11/2019 | Khlat | H03F 1/02 |
| 2020/0076297 A1* | 3/2020 | Nag | H02M 3/156 |
| 2020/0127612 A1* | 4/2020 | Khlat | H03F 1/0222 |
| 2020/0136575 A1* | 4/2020 | Khlat | H03F 1/02 |
| 2020/0204422 A1* | 6/2020 | Khlat | H04L 27/2646 |
| 2020/0212796 A1* | 7/2020 | Murphy | H02M 3/07 |
| 2020/0266766 A1* | 8/2020 | Khlat | H03F 1/0238 |
| 2020/0336105 A1* | 10/2020 | Khlat | H03F 1/0211 |
| 2020/0336111 A1 | 10/2020 | Khlat | |
| 2020/0389132 A1* | 12/2020 | Khlat | H03F 3/45475 |
| 2021/0036604 A1* | 2/2021 | Khlat | H03F 1/0211 |
| 2021/0126599 A1* | 4/2021 | Khlat | H03F 3/195 |
| 2021/0175798 A1 | 6/2021 | Liang | |
| 2021/0184708 A1 | 6/2021 | Khlat | |
| 2021/0226585 A1* | 7/2021 | Khlat | H03F 3/213 |
| 2021/0257971 A1* | 8/2021 | Kim | H03F 1/0227 |
| 2021/0265953 A1* | 8/2021 | Khlat | H04L 5/0007 |
| 2021/0389789 A1* | 12/2021 | Khlat | G05F 1/575 |
| 2021/0391833 A1* | 12/2021 | Khlat | H03F 3/245 |
| 2022/0021302 A1* | 1/2022 | Khlat | H02M 3/07 |
| 2022/0029614 A1* | 1/2022 | Khlat | G06F 1/26 |
| 2022/0052655 A1* | 2/2022 | Khlat | H03F 3/195 |
| 2022/0057820 A1* | 2/2022 | Khlat | G05F 1/46 |
| 2022/0066487 A1* | 3/2022 | Khlat | G05F 1/46 |
| 2022/0069788 A1* | 3/2022 | King | H03F 3/195 |
| 2022/0123744 A1* | 4/2022 | Khlat | H02J 50/10 |

OTHER PUBLICATIONS

Non-Final Office Action for U.S. Appl. No. 17/237,244, dated Sep. 20, 2021, 14 pages.
Non-Final Office Action for U.S. Appl. No. 17/325,482, dated Sep. 30, 2021, 10 pages.
Non-Final Office Action for U.S. Appl. No. 17/315,652, dated Sep. 2, 2021, 7 pages.
Notice of Allowance for U.S. Appl. No. 17/237,244, dated Jan. 27, 2022, 8 pages.
Non-Final Office Action for U.S. Appl. No. 17/325,482, dated Mar. 15, 2022, 10 pages.
Non-Final Office Action for U.S. Appl. No. 17/315,652, dated Feb. 14, 2022, 12 pages.
International Search Report and Written Opinion for International Patent Application No. PCT/US2021/061721, dated Mar. 14, 2022, 13 pages.
Non-Final Office Action for U.S. Appl. No. 17/217,654, dated Jul. 1, 2022, 9 pages.
Notice of Allowance for U.S. Appl. No. 17/315,652, dated Jun. 20, 2022, 8 pages.
International Preliminary Report on Patentability for International Patent Application No. PCT/US2021/044596, dated Sep. 1, 2022, 19 pages.
Notice of Allowance for U.S. Appl. No. 17/182,539, dated Sep. 14, 2022, 7 pages.
Notice of Allowance for U.S. Appl. No. 17/217,654, dated Oct. 12, 2022, 8 pages.
Final Office Action for U.S. Appl. No. 17/325,482, dated Aug. 16, 2022, 12 pages.
Advisory Action for U.S. Appl. No. 17/325,482, dated Oct. 14, 2022, 3 pages.
Non-Final Office Action for U.S. Appl. No. 17/408,899, dated Aug. 29, 2022, 13 pages.
Written Opinion for International Patent Application No. PCT/US2021/061721, dated Sep. 9, 2022, 7 pages.

* cited by examiner

POWER MANAGEMENT CIRCUIT OPERABLE WITH LOW BATTERY

RELATED APPLICATIONS

This application claims the benefit of provisional patent application Ser. No. 63/058,916, filed Jul. 30, 2020, the disclosure of which is hereby incorporated herein by reference in its entirety.

FIELD OF THE DISCLOSURE

The technology of the disclosure relates generally to an average power tracking (APT) power management circuit.

BACKGROUND

Fifth-generation (5G) new radio (NR) (5G-NR) has been widely regarded as the next generation of wide-area wireless communication technology beyond the current third-generation (3G) and fourth-generation (4G) technologies. In this regard, a wireless communication device capable of supporting the 5G-NR wireless communication technology is expected to achieve higher data rate, improved coverage range, enhanced signaling efficiency, and reduced latency across a wide range of radio frequency (RF) bands, which include a low-band (below 1 GHz), a mid-band (1 GHz to 6 GHz), and a high-band (above 24 GHz). Moreover, the wireless communication device may still support the legacy 3G and 4G technologies for backward compatibility.

In addition to the wide-area wireless communication technologies above, the wireless communication device is required to support such local area or personal area networking technologies as Wi-Fi, Bluetooth, ultra-wideband (UWB), and so on. Furthermore, the wireless communication device may also need to support such internet-of-things (IoT) applications as keyless car entry, remote garage door opening, contactless payment, mobile boarding pass, and so on. Needless to say, the wireless communication device must also make 911/E911 service accessible under emergency situations.

Notably, the wireless communication device relies on a battery cell (e.g., Li-Ion battery) to power its operations and services. Despite recent advancement in battery technologies, the wireless communication device can run into a low battery situation from time to time. In this regard, it is desirable to keep the wireless communication device operable under a low battery condition to continue to support 911/E911 service and certain IoT applications.

SUMMARY

Embodiments of the disclosure relate to a power management circuit operable with low battery. The power management circuit is configured to generate a time-variant average power tracking (APT) voltage based on a battery voltage supplied by a voltage source (e.g., battery). In examples disclosed herein, the power management circuit can be configured to remain operable when the battery voltage drops below a low battery threshold. Specifically, the power management circuit maintains the time-variant APT voltage at a constant level in response to the battery voltage dropping below the low battery threshold to thereby avoid drawing a rush current from the voltage source. As a result, a wireless device employing the power management circuit can remain operable with low battery to continue to support critical applications.

In one aspect, a power management circuit is provided. The power management circuit includes a voltage circuit configured to generate an APT voltage at a voltage output based on a battery voltage supplied by a voltage source. The power management circuit also includes a control circuit. The control circuit is configured to determine whether the battery voltage is below a low battery threshold. The control circuit is also configured to cause the voltage circuit to operate in a first mode to thereby maintain the APT voltage at a constant voltage level at the voltage output in response to the battery voltage being below the low battery threshold.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
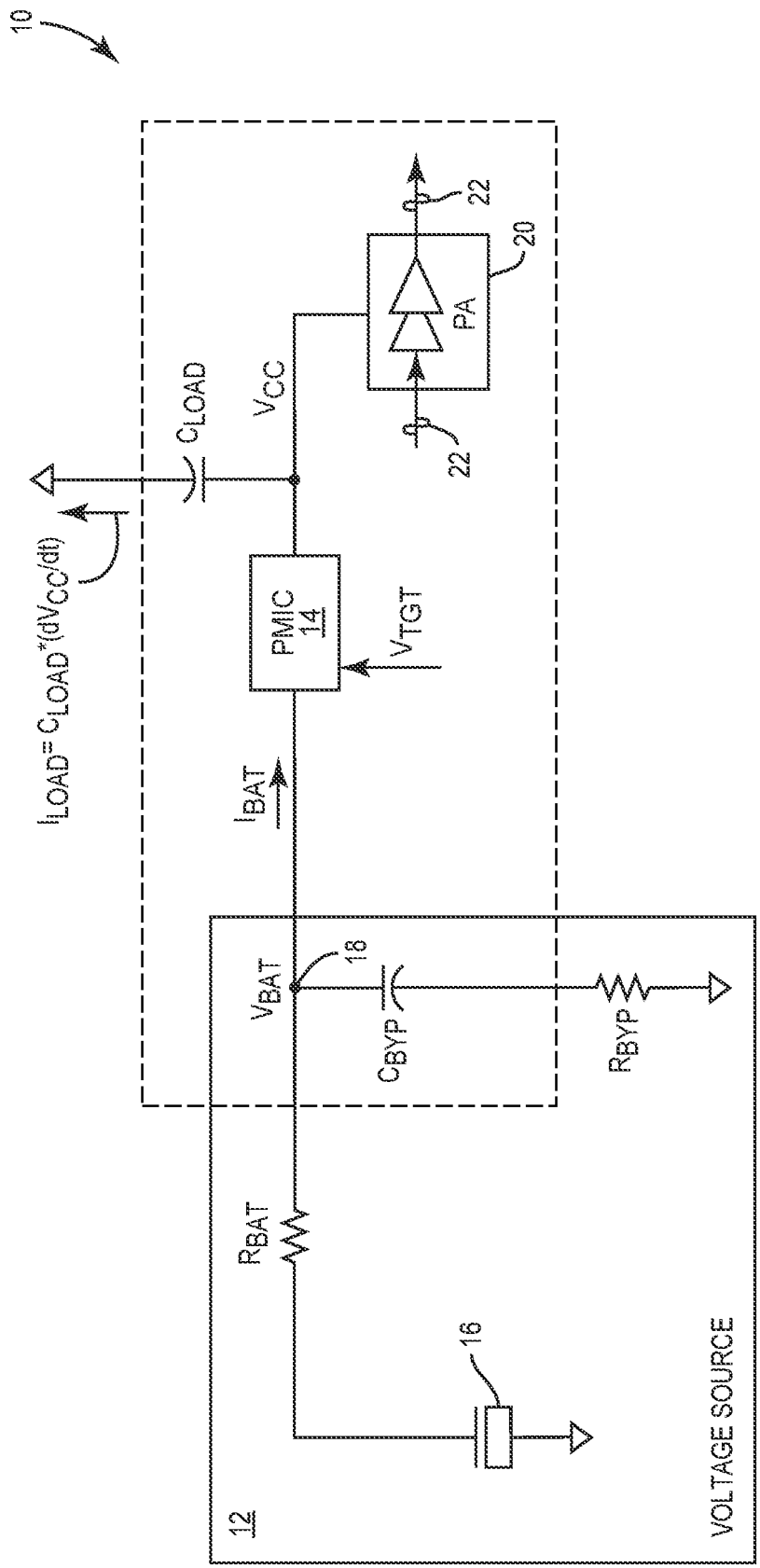
FIG. 1A is a schematic diagram of an exemplary conventional power management circuit that may fail to operate under a low battery condition.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a power management circuit operable with low battery. The power management circuit is configured to generate a time-variant average power tracking (APT) voltage based on a battery voltage supplied by a voltage source (e.g., battery). In examples disclosed herein, the power management circuit can be configured to remain operable when the battery voltage drops below a low battery threshold. Specifically, the power management circuit maintains the time-variant APT voltage at a constant level in response to the battery voltage dropping below the low battery threshold to thereby avoid drawing a rush current from the voltage source. As a result, a wireless device employing the power management circuit can remain operable with low battery to continue to support critical applications.

Figure 1B:
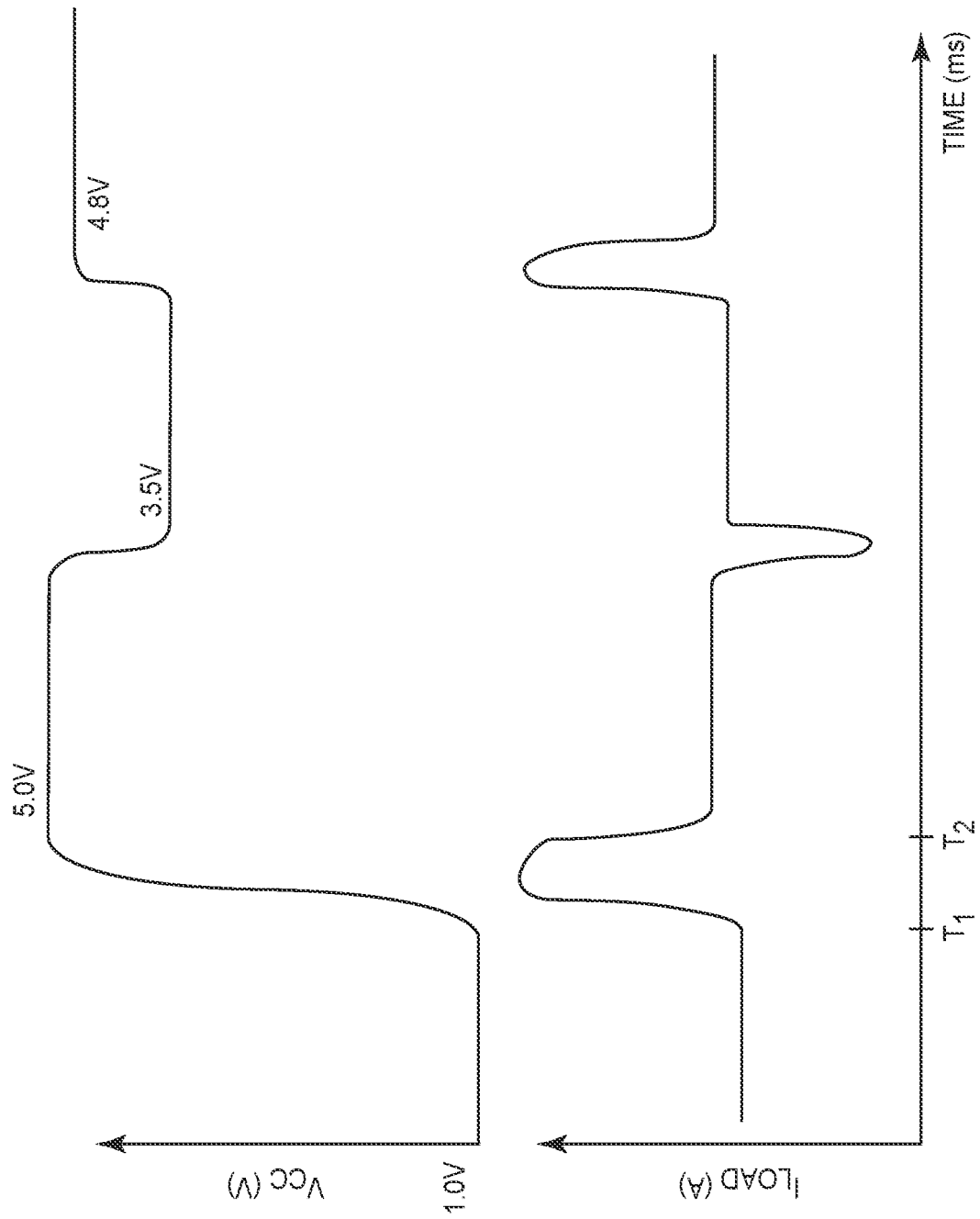
FIG. 1B is a graphic diagram providing an exemplary illustration of a rush current drawn from a voltage source in the conventional power management circuit of FIG. 1A as a result of changes of a time-variant average power tracking (APT) voltage.
Figure 1C:
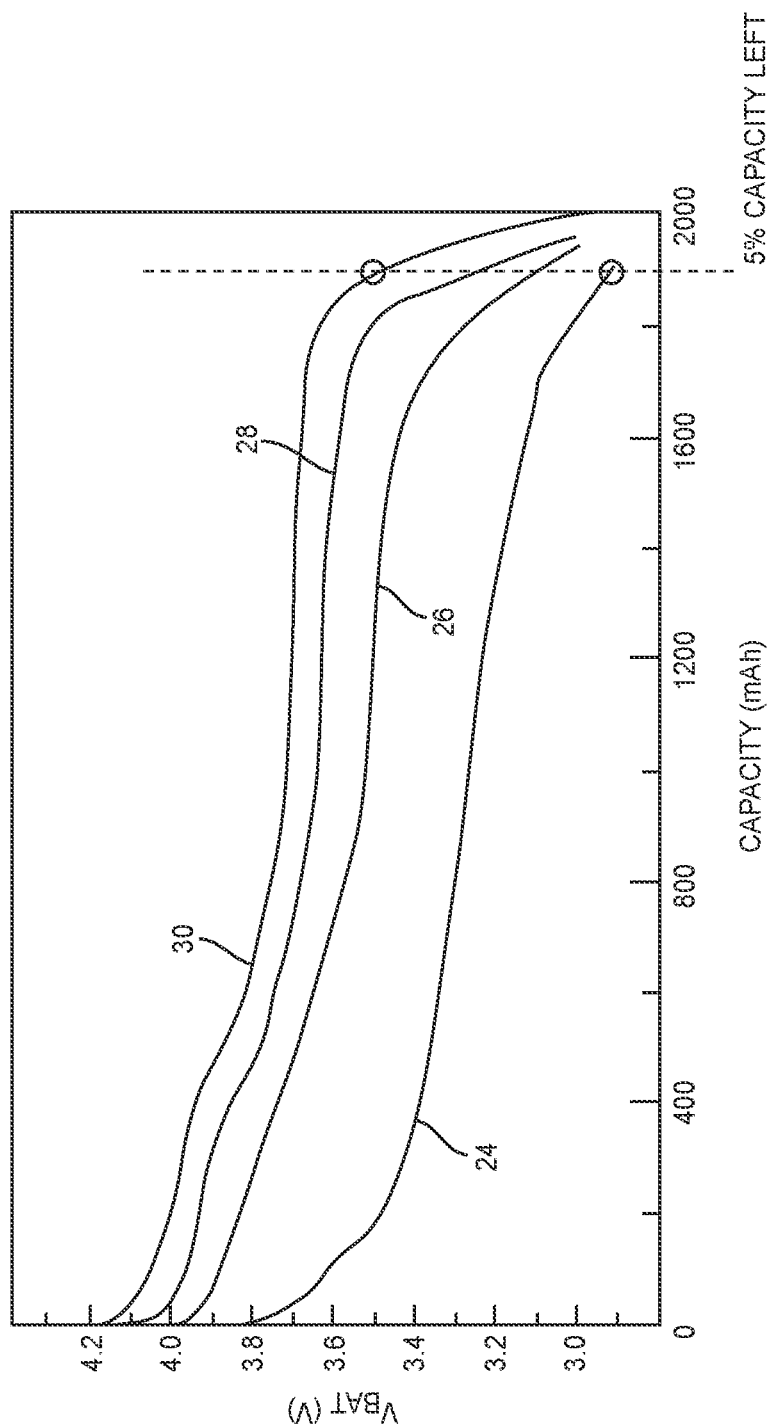
FIG. 1C is a graphic diagram providing an exemplary illustration as to how the rush current in FIG. 1B can cause the conventional power management circuit of FIG. 1A to fail to operate under a low battery condition.
Figure 2:
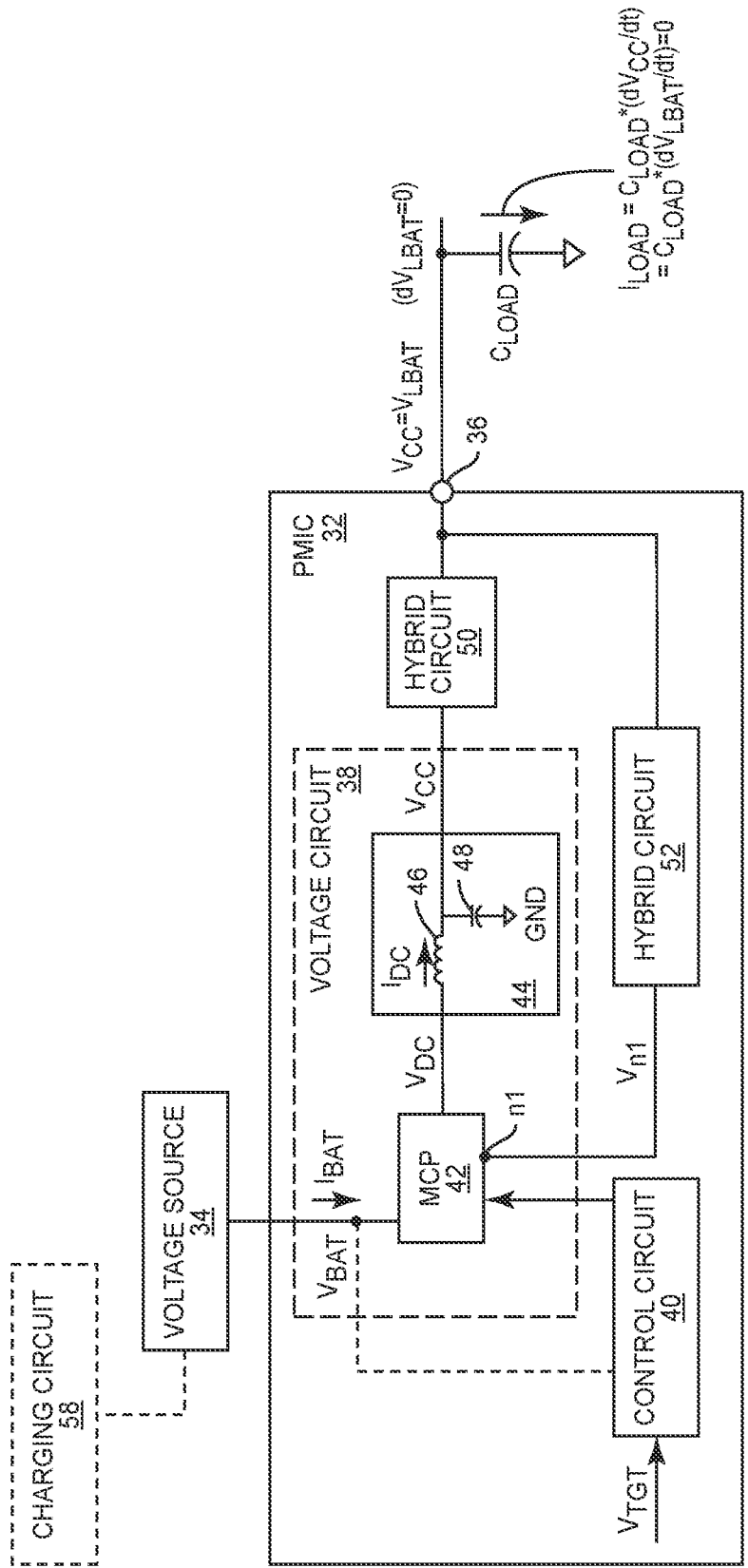
FIG. 2 is a schematic diagram of an exemplary power management circuit configured according to embodiments of the present disclosure to remain operable under a low battery condition.

Before discussing the power management circuit operable with low battery according to the present disclosure, starting at FIG. 2, an overview of a conventional power management circuit that may fail to operate with low battery is first provided with reference to FIGS. 1A-1C.

FIG. 1A is a schematic diagram of an exemplary conventional power management circuit 10 that may fail to operate under a low battery condition. The conventional power management circuit 10 includes a voltage source 12 and a power management integrated circuit (PMIC) 14. The voltage source 12 includes a battery 16 (e.g., a Li-Ion battery) that supplies a battery voltage $V_{BAT}$ at a coupling node 18. The PMIC 14 is coupled to the coupling node 18 to receive the battery voltage $V_{BAT}$ and draw a battery current $I_{BAT}$. Accordingly, the PMIC 14 is configured to generate a time-variant APT voltage $V_{CC}$ based on the battery voltage $V_{BAT}$ and provide the time-variant APT voltage $V_{CC}$ to a power amplifier circuit 20 for amplifying a radio frequency (RF) signal 22.

The RF signal 22 may be modulated across a wide modulation bandwidth, which can cause a large variation of RF current at the power amplifier 20. As such, it is necessary to present a low impedance to the power amplifier circuit 20 to help reduce ripple in the APT voltage $V_{CC}$ caused by the RF current. In this regard, the conventional power management circuit 10 typically includes a large capacitor $C_{LOAD}$ to help reduce the impedance seen by the power amplifier circuit 20.

To avoid amplitude clipping to the RF signal 22 and improve efficiency of the power amplifier 20, the PMIC 14 is configured to generate the time-variant APT voltage $V_{CC}$ in accordance with a time-variant APT target voltage $V_{TGT}$ that tracks amplitude variations of the RF signal 22. In this regard, the time-variant APT voltage $V_{CC}$ can swing from low to high, or vice versa, from time to time.

Notably, the PMIC 14 will draw a rush current $I_{LOAD}$, which may be proportionally related to the battery current $I_{BAT}$, whenever the time-variant APT voltage $V_{CC}$ changes. As shown in the equation (Eq. 1) below, the rush current $I_{LOAD}$ may depend on a capacitance of the capacitor $C_{LOAD}$ and a rate at which the time-variant APT voltage $V_{CC}$ changes.

$$I_{LOAD} = C_{LOAD} * (dV_{CC}/dt) \tag{Eq. 1}$$

The rush current $I_{LOAD}$ as expressed in the equation (Eq. 1) can be illustrated graphically. In this regard, FIG. 1B is a graphic diagram providing an exemplary illustration of the rush current $I_{LOAD}$ in the conventional power management circuit 10 of FIG. 1A as a result of changes of the time-variant APT voltage $V_{CC}$.

For example, when the time-variant APT voltage $V_{CC}$ changes from 1 V to 5 V within 0.1 to 1 μs (between time $T_1$ and $T_2$) and the capacitance of the large capacitor $C_{LOAD}$ is 2.2 μF, the rush current $I_{LOAD}$ can be very high. As shown in FIG. 1C below, the high rush current $I_{LOAD}$ can negatively impact operability of the conventional power management circuit 10, especially when the voltage source 12 is at a lower battery capacity (e.g., <5%). In this regard, FIG. 1C is a graphic diagram providing an exemplary illustration as to how the rush current $I_{LOAD}$ in FIG. 1B can cause the conventional power management circuit 10 of FIG. 1A to fail to operate under a low battery condition.

FIG. 1C illustrates four different capacity change curves 24, 26, 28, and 30 corresponding to four different levels of the rush current $I_{LOAD}$. Among them, the capacity change curve 24 corresponds to a highest rush current $I_{LOAD}$ (e.g., 4 A) and the capacity change curve 30 corresponds to a lowest rush current $I_{LOAD}$ (e.g., 0.4 A). As illustrated, when the voltage source 12 is at 5% battery capacity, the highest rush current $I_{LOAD}$ can reduce the battery voltage $V_{BAT}$ by approximately 0.6 V relative to the lowest rush current $I_{LOAD}$.

The further reduction in the battery voltage $V_{BAT}$ resulting from the higher rush current $I_{LOAD}$ may cause the conventional power management circuit 10 to become inoperable to support many critical applications (e.g., 911/E911), especially when the voltage source 12 is already having a low battery capacity.

As such, it is desirable to reduce the rush current $I_{LOAD}$ to help keep the conventional power management circuit 10 operable for as long as possible under the lower battery capacity.

In this regard, FIG. 2 is a schematic diagram of an exemplary power management circuit 32 (denoted as "PMIC") configured according to embodiments of the present disclosure to remain operable under a low battery condition. The power management circuit 32 is coupled to a voltage source 34 to receive a battery voltage $V_{BAT}$ and configured to generate an APT voltage $V_{CC}$ at a voltage output 36. In a non-limiting example, the voltage source 34 can be identical to or functionally equivalent to the voltage source 12 in FIG. 1A. As such, like the PMIC 14 in FIG. 1A, the power management circuit 32 draws a rush current $I_{LOAD}$ when the APT voltage $V_{CC}$ changes from one voltage level to another.

As discussed in detail below, the power management circuit 32 is configured to determine whether the battery voltage $V_{BAT}$ is below a low battery threshold (e.g., <3 V) and operate in a standby mode (also referred to as "first mode") to maintain the APT voltage $V_{CC}$ at a constant voltage level $V_{LBAT}$ in response to the battery voltage $V_{BAT}$ being below the low battery threshold. By maintaining the APT voltage $V_{CC}$ at the constant level $V_{LBAT}$, the power management circuit 32 can eliminate any change in the APT voltage $V_{CC}$ ($dV_{CC}/dt=0$), thus eliminating the rush current $I_{LOAD}$ in accordance with the equation (Eq. 1) above. As a result, a battery-powered wireless communication device (e.g., smartphone) employing the power management circuit 32 can remain operable with low battery to continue to support such critical applications as 911/E911.

In a non-limiting example, the power management circuit 32 includes a voltage circuit 38 and a control circuit 40, which can be a field-programmable gate array (FPGA), as an example. The voltage circuit 38 is configured to generate the APT voltage $V_{CC}$ at the voltage output 36 based on the battery voltage $V_{BAT}$ supplied by the voltage source 34. The control circuit 40 is configured to determine whether the battery voltage is below the low battery threshold and cause the voltage circuit 38 to operate in the first mode to thereby maintain the APT voltage $V_{CC}$ at the constant voltage level $V_{LBAT}$ in response to the battery voltage $V_{BAT}$ being below the low battery threshold.

In contrast, when the control circuit 40 determines that the battery voltage $V_{BAT}$ is equal to or above the low battery threshold, the control circuit 40 can be configured to cause the voltage circuit 38 to operate in a normal mode (also referred to as "second mode") to thereby generate the APT voltage $V_{CC}$ at the voltage output 36 in accordance with a time-variant APT target voltage $V_{TGT}$. In this regard, the power management circuit 32 will draw the rush current $I_{LOAD}$ from the voltage source 34 when the APT voltage $V_{CC}$ changes in accordance with the time-variant APT target voltage $V_{TGT}$.

The voltage circuit 38 may include a multi-level charge pump 42 (denoted as "MCP") and an inductor-capacitor (LC) circuit 44. The multi-level charge pump 42 is configured to generate a low-frequency voltage $V_{DC}$ at multiple voltage levels based on the battery voltage $V_{BAT}$. Notably, the multi-level charge pump 42 may be configured to generate the low-frequency voltage $V_{DC}$ at different levels based on a selected duty cycle. Accordingly, the LC circuit 44 is configured to output an average of the multiple voltage levels of the low-frequency voltage $V_{DC}$ as the APT voltage $V_{CC}$. For example, the multi-level charge pump 42 may generate the low-frequency voltage $V_{DC}$ at 1 V for 70% of the time and at 5 V for 30% of the time. Accordingly, the LC circuit 44 will output the APT voltage $V_{CC}$ at 2.2 V (1 V*70%+5 V*30%).

In a non-limiting example, the multi-level charge pump 42 can operate in a buck mode to generate the low-frequency voltage $V_{DC}$ at or below the battery voltage $V_{BAT}$ ($V_{DC} \leq V_{BAT}$) or in a boost mode to generate the low-frequency voltage $V_{DC}$ at two times the battery voltage $V_{BAT}$ ($V_{DC}=2V_{BAT}$). In this non-limiting example, since a maximum of the low-frequency voltage $V_{DC}$ is at two times the battery voltage $V_{BAT}$, the control circuit 40 can cause the voltage circuit 38 to maintain the APT voltage $V_{CC}$ at the constant voltage level $V_{LBAT}$ at or below two times the battery voltage $V_{BAT}$ ($V_{LBAT} \leq 2V_{BAT}$). The control circuit 40 may determine the constant voltage level $V_{LBAT}$ based on, for example, an anticipated peak of the APT voltage $V_{CC}$.

The LC circuit 44 includes a power inductor 46 and a bypass capacitor 48 and is configured to function as a low-pass filter to output the average of the multiple levels of the low-frequency voltage $V_{DC}$ as the APT voltage $V_{CC}$. Specifically, the power inductor 46 induces a respective low-frequency current $I_{DC}$ (e.g., a constant current) based on each of the multiple levels of the low-frequency voltage $V_{DC}$ to charge the bypass capacitor 48. As a result, the LC circuit 44 outputs the APT voltage $V_{CC}$ that equals the average of the multiple levels of the low-frequency voltage $V_{DC}$.

The power management circuit 32 can include a first hybrid circuit 50 configured to operate in a switch mode or a low-dropout (LDO) mode. The first hybrid circuit 50 is coupled between the LC circuit 44 and the voltage output 36. When operating in the switch mode, the first hybrid circuit 50 provides the APT voltage $V_{CC}$ outputted from the LC circuit 44 directly to the voltage output 36. Accordingly, the APT voltage $V_{CC}$ at the voltage output 36 may be substantially equal to the APT voltage $V_{CC}$ outputted by the LC circuit 44. When operating in the LDO mode, the first hybrid circuit 50 regulates (e.g., reduces) the APT voltage $V_{CC}$ outputted from the LC circuit 44 before outputting the APT voltage $V_{CC}$ at the voltage output 36. In this regard, the APT voltage $V_{CC}$ at the voltage output 36 may be lower than the APT voltage $V_{CC}$ outputted by the LC circuit 44.

The power management circuit 32 also includes a second hybrid circuit 52 configured to operate in the switch mode and the LDO mode. The second hybrid circuit 52 is coupled between a first intermediate node n1 in the multi-level charge pump 42 and the voltage output 36. When operating in the switch mode, the second hybrid circuit 52 provides a voltage $V_{n1}$ at the first intermediate node n1 directly to the voltage output 36. Accordingly, the APT voltage $V_{CC}$ at the voltage output 36 may be substantially equal to the voltage $V_{n1}$ at the first intermediate node n1. When operating in the LDO mode, the second hybrid circuit 52 regulates (e.g., reduces) the voltage $V_{n1}$ before outputting the voltage $V_{n1}$ at the voltage output 36. In this regard, the APT voltage $V_{CC}$ at the voltage output 36 is lower than the voltage $V_{n1}$ at the first intermediate node n1.

Figure 3A:
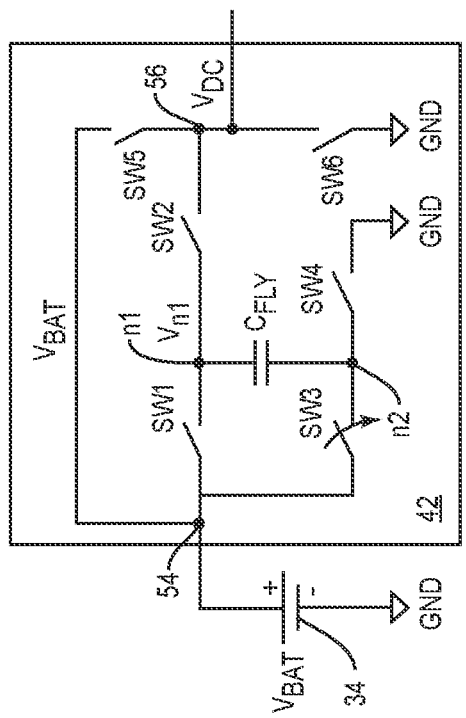
FIGS. 3A-3B are schematic diagrams providing exemplary illustrations of different operating modes of a multi-level charge pump in the power management circuit of FIG. 2.

In one embodiment, the control circuit 40 may cause the power management circuit 32 to maintain the APT voltage $V_{CC}$ at the constant level $V_{LBAT}$ that is lower than or equal to the battery voltage $V_{BAT}$ ($V_{LBAT} \leq V_{BAT}$) when the control circuit 40 determines that the battery voltage $V_{BAT}$ is below the low battery threshold. Accordingly, the control circuit 40 can control the multi-level charge pump 42 to output the low-frequency voltage $V_{DC}$ that equals the battery voltage $V_{BAT}$. In this regard, FIG. 3A is a schematic diagram providing an exemplary illustration of the multi-level charge pump 42 configured to output the low-frequency voltage $V_{DC}$ that equals the battery voltage $V_{BAT}$. Common elements between FIGS. 2 and 3A are shown therein with common element numbers and will not be re-described herein.

The multi-level charge pump 42 includes an input node 54, an output node 56, the first intermediate node n1, and a second intermediate node n2. Specifically, the input node 54 is coupled to the voltage source 34 to receive the battery voltage $V_{BAT}$, and the output node 56 is configured to output the low-frequency voltage $V_{DC}$. The multi-level charge pump 42 includes a first switch SW1, a second switch SW2, a third switch SW3, a fourth switch SW4, a fifth switch SW5, and a sixth switch SW6. The first switch SW1 is coupled between the input node 54 and the first intermediate node n1. The second switch SW2 is coupled between the first intermediate node n1 and the output node 56. The third switch SW3 is coupled between the input node 54 and the second intermediate node n2. The fourth switch SW4 is coupled between the second intermediate node n2 and a ground (GND). The fifth switch SW5 is coupled between the input node 54 and the output node 56. The sixth switch SW6 is coupled between the output node 56 and the GND. The multi-level charge pump 42 also includes a fly capacitor $C_{FLY}$ that is coupled between the first intermediate node n1 and the second intermediate node n2.

To cause the multi-level charge pump 42 to output the low-frequency voltage $V_{DC}$ to be equal to the battery voltage $V_{BAT}$, the control circuit 40 closes the fifth switch SW5, while keeping the second switch SW2, the third switch SW3, and the sixth switch SW6 open, to thereby couple the output node 56 directly to the voltage source 34. As a result, the multi-level charge pump 42 will output the low-frequency voltage $V_{DC}$ that equals the battery voltage $V_{BAT}$.

Concurrent to outputting the low-frequency voltage $V_{DC}$ at the battery voltage $V_{BAT}$, the control circuit 40 may further close the first switch SW1 and the fourth switch SW4 to thereby charge the fly capacitor $C_{FLY}$ to thereby pull the voltage $V_{n1}$ at the first intermediate node n1 up to the battery voltage $V_{BAT}$. As illustrated next in FIG. 3B, by charging the fly capacitor $C_{FLY}$ to the battery voltage $V_{BAT}$, the multi-level charge pump 42 can output the voltage $V_{n1}$ that equals two times the battery voltage $V_{BAT}$. Alternatively, the control circuit 40 may also keep the first switch SW1 and the fourth switch SW4 open such that the fly capacitor $C_{FLY}$ will not be charged.

With reference back to FIG. 2, in case the APT voltage $V_{CC}$ is maintained at the constant level $V_{LBAT}$ that equals the battery voltage $V_{BAT}$ ($V_{LBAT}=V_{BAT}$), the control circuit 40 can control the first hybrid circuit 50 to operate in the switch mode to provide the low-frequency voltage $V_{DC}$ directly to the voltage output 36. In contrast, if the APT voltage $V_{CC}$ is maintained at the constant level $V_{LBAT}$ that is lower that the battery voltage $V_{BAT}$ ($V_{LBAT} \leq V_{BAT}$), the control circuit 40 can control the first hybrid circuit 50 to operate in the LDO mode to reduce the low-frequency voltage $V_{DC}$ before providing the low-frequency voltage $V_{DC}$ to the voltage output 36.

Figure 3B:
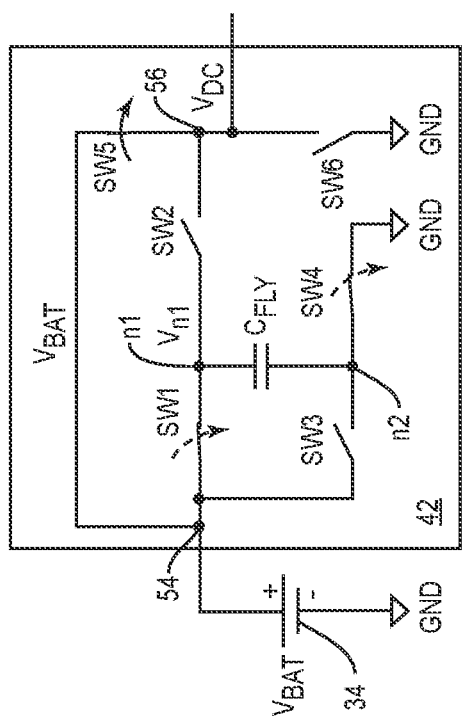

In another embodiment, the control circuit 40 may cause the power management circuit 32 to maintain the APT voltage $V_{CC}$ at the constant level $V_{LBAT}$ that is above the battery voltage $V_{BAT}$ but lower than or equal to two times the battery voltage $V_{BAT}$ ($V_{BAT} < V_{LBAT} \leq 2V_{BAT}$) when the control circuit 40 determines that the battery voltage $V_{BAT}$ is below the low battery threshold. Accordingly, the control circuit 40 can control the multi-level charge pump 42 to output the voltage $V_{n1}$ at the first intermediate node n1 that equals two times the battery voltage $V_{BAT}$. In this regard, FIG. 3B is a schematic diagram providing an exemplary illustration of the multi-level charge pump 42 configured to output the voltage $V_{n1}$ that equals two times the battery voltage $V_{BAT}$. Common elements between FIGS. 3A and 3B are shown therein with common element numbers and will not be re-described herein.

Notably, prior to outputting the voltage $V_{n1}$ at two times the battery voltage $V_{BAT}$, the fly capacitor $C_{FLY}$ must first be charged such that the voltage $V_{n1}$ at the first intermediate node n1 is pulled up to the battery voltage $V_{BAT}$. Accordingly, the control circuit 40 can close the third switch SW3 concurrent to opening the first switch SW1, the second switch SW2, the fourth switch SW4, the fifth switch SW5, and the sixth switch SW6. By closing the third switch SW3, the multi-level charge pump 42 can output the voltage $V_{n1}$ at two times the battery voltage $V_{BAT}$.

With reference back to FIG. 2, in case the APT voltage $V_{CC}$ is maintained at the constant level $V_{LBAT}$ that equals two times the battery voltage $V_{BAT}$ ($V_{LBAT}=2V_{BAT}$), the control circuit 40 can control the second hybrid circuit 52 to operate in the switch mode to provide the voltage $V_{n1}$ directly to the voltage output 36. In contrast, if the APT voltage $V_{CC}$ is maintained at the constant level $V_{LBAT}$ that is lower that two times the battery voltage $V_{BAT}$ ($V_{LBAT} < 2V_{BAT}$), the control circuit 40 can control the second hybrid circuit 52 to operate in the LDO mode to reduce the voltage $V_{n1}$ before providing the voltage $V_{n1}$ to the voltage output 36.

The voltage source 34 may also be coupled to a charging circuit 58. The charging circuit 58 may include, for example, a solar panel to harvest solar energy. In this regard, the charging circuit 58 may replenish the battery in the voltage source 34 while the power management circuit 32 is operating in the standby mode to conserve energy.

Those skilled in the art will recognize improvements and modifications to the preferred embodiments of the present disclosure. All such improvements and modifications are considered within the scope of the concepts disclosed herein and the claims that follow.

What is claimed is:

1. A power management circuit comprising:
   a voltage circuit configured to generate an average power tracking (APT) voltage at a voltage output based on a battery voltage supplied by a voltage source; and
   a control circuit configured to:
   determine whether the battery voltage is below a low battery threshold; and
   cause the voltage circuit to operate in a first mode to thereby maintain the APT voltage at a constant voltage level that is lower than or equal to two times the battery voltage at the voltage output in response to the battery voltage being below the low battery threshold.

2. The power management circuit of claim 1 wherein the control circuit is further configured to cause the voltage circuit to operate in a second mode to thereby generate the APT voltage at the voltage output in accordance with a time-variant APT target voltage in response to the battery voltage being above the low battery threshold.

3. The power management circuit of claim 1 wherein the control circuit is further configured to cause the voltage circuit to maintain the APT voltage at the constant voltage level in the first mode to thereby eliminate a rush current drawn from the voltage source.

4. The power management circuit of claim 1 wherein the voltage circuit comprises:
- a multi-level charge pump configured to generate a low-frequency voltage at multiple voltage levels based on the battery voltage and in accordance with a selected duty cycle; and
- an inductor-capacitor (LC) circuit configured to output an average of the multiple voltage levels of the low-frequency voltage as the APT voltage.

5. The power management circuit of claim 4 wherein the multi-level charge pump is further configured to:
- operate in a buck mode to generate the low-frequency voltage at the battery voltage; and
- operate in a boost mode to generate the low-frequency voltage at the two times the battery voltage.

6. The power management circuit of claim 4 further comprising:
- a first hybrid circuit coupled between the LC circuit and the voltage output and is configured to:
  - operate in a switch mode to provide the average of the multiple voltage levels of the low-frequency voltage directly to the voltage output; and
  - operate in a low-dropout (LDO) mode to regulate the average of the multiple voltage levels of the low-frequency voltage to be provided to the voltage output; and
- a second hybrid circuit coupled between a first intermediate node in the multi-level charge pump and the voltage output and is configured to:
  - operate in the switch mode to provide a voltage at the first intermediate node directly to the voltage output; and
  - operate in the LDO mode to regulate the voltage at the first intermediate node to be provided to the voltage output.

7. The power management circuit of claim 6 wherein the multi-level charge pump comprises:
- an input node coupled to the voltage source to receive the battery voltage;
- an output node to output the low-frequency voltage at the multiple voltage levels;
- a first switch coupled between the input node and the first intermediate node;
- a second switch coupled between the first intermediate node and the output node;
- a third switch coupled between the input node and a second intermediate node;
- a fourth switch coupled between the second intermediate node and a ground;
- a fifth switch coupled between the input node and the output node;
- a sixth switch coupled between the fifth switch and the ground; and
- a fly capacitor coupled between the first intermediate node and the second intermediate node.

8. The power management circuit of claim 7 wherein the control circuit is further configured to:
- close the fifth switch and open the second switch, the third switch, and the sixth switch to thereby generate the low-frequency voltage at the battery voltage; and
- cause the first hybrid circuit to operate in the LDO mode to thereby maintain the constant voltage level below the battery voltage.

9. The power management circuit of claim 8 wherein the control circuit is further configured to open the first switch and the fourth switch.

10. The power management circuit of claim 8 wherein the control circuit is further configured to close the first switch and the fourth switch to charge the fly capacitor to thereby raise the voltage at the first intermediate node to the battery voltage.

11. The power management circuit of claim 10 wherein the control circuit is further configured to cause the second hybrid circuit to operate in the LDO mode to thereby maintain the constant voltage level below the battery voltage.

12. The power management circuit of claim 7 wherein the control circuit is further configured to:
- close the fifth switch and open the second switch, the third switch, and the sixth switch to thereby generate the low-frequency voltage at the battery voltage; and
- cause the first hybrid circuit to operate in the switch mode to thereby maintain the constant voltage level at the battery voltage.

13. The power management circuit of claim 12 wherein the control circuit is further configured to open the first switch and the fourth switch.

14. The power management circuit of claim 12 wherein the control circuit is further configured to close the first switch and the fourth switch to charge the fly capacitor to thereby raise the voltage at the first intermediate node to the battery voltage.

15. The power management circuit of claim 14 wherein the control circuit is further configured to cause the second hybrid circuit to operate in the switch mode to thereby maintain the constant voltage level below the battery voltage.

16. The power management circuit of claim 7 wherein the control circuit is further configured to:
- Close the third switch and open the first switch, the second switch, the fourth switch, the fifth switch, and the sixth switch to thereby maintain the voltage at the first intermediate node at the two times the battery voltage; and
- cause the second hybrid circuit to operate in the LDO mode to thereby maintain the constant voltage level to be higher than the battery voltage and lower than the two times the battery voltage.

17. The power management circuit of claim 7 wherein the control circuit is further configured to:
- Close the third switch and open the first switch, the second switch, the fourth switch, the fifth switch, and the sixth switch to thereby maintain the voltage at the first intermediate node at the two times the battery voltage; and
- cause the first hybrid circuit to operate in the switch mode to thereby maintain the constant voltage level at the two times the battery voltage.

* * * * *